US012609739B2

(12) United States Patent
Yang et al.

(10) Patent No.: US 12,609,739 B2
(45) Date of Patent: Apr. 21, 2026

(54) SYSTEMS AND METHODS FOR TRANSMITTING RADIO FREQUENCY SIGNALS

(71) Applicant: Apple Inc., Cupertino, CA (US)

(72) Inventors: Hailong Yang, San Francisco, CA (US); Lijie Zhang, Beijing (CN); Kexin Ma, San Diego, CA (US); Peng Xiao, San Diego, CA (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 18/114,851

(22) Filed: Feb. 27, 2023

(65) Prior Publication Data

US 2024/0291532 A1     Aug. 29, 2024

(51) Int. Cl.
H04B 7/06 (2006.01)
H04W 52/36 (2009.01)

(52) U.S. Cl.
CPC ........ H04B 7/0608 (2013.01); H04W 52/367 (2013.01)

(58) Field of Classification Search
CPC ... H04B 7/0608; H04W 52/367; H04W 52/42
See application file for complete search history.

(56) References Cited

U.S. PATENT DOCUMENTS

| | | | |
|---|---|---|---|
| 2007/0173208 A1* | 7/2007 | Nishio | H04B 7/0868 455/140 |
| 2013/0308554 A1* | 11/2013 | Ngai | H04B 1/44 370/329 |
| 2015/0094003 A1 | 4/2015 | Ramkumar et al. | |
| 2024/0364376 A1* | 10/2024 | Black | H04W 52/42 |

FOREIGN PATENT DOCUMENTS

| | | | |
|---|---|---|---|
| CN | 107659347 A | 2/2018 | |
| KR | 102202935 B1 * | 1/2021 | H04B 7/0452 |
| WO | 2021066855 A1 | 4/2021 | |

* cited by examiner

*Primary Examiner* — Zhitong Chen
(74) *Attorney, Agent, or Firm* — FLETCHER YODER PC

(57) ABSTRACT

One or more antennas of an electronic device are selected to transmit wireless signals based at least in part on maximum transmitted power limits (MTPLs) associated with the antennas. The one or more antennas may also be selected based on signal characteristic values, efficiency values, or both signal characteristic values and efficiency values.

20 Claims, 6 Drawing Sheets

200

200

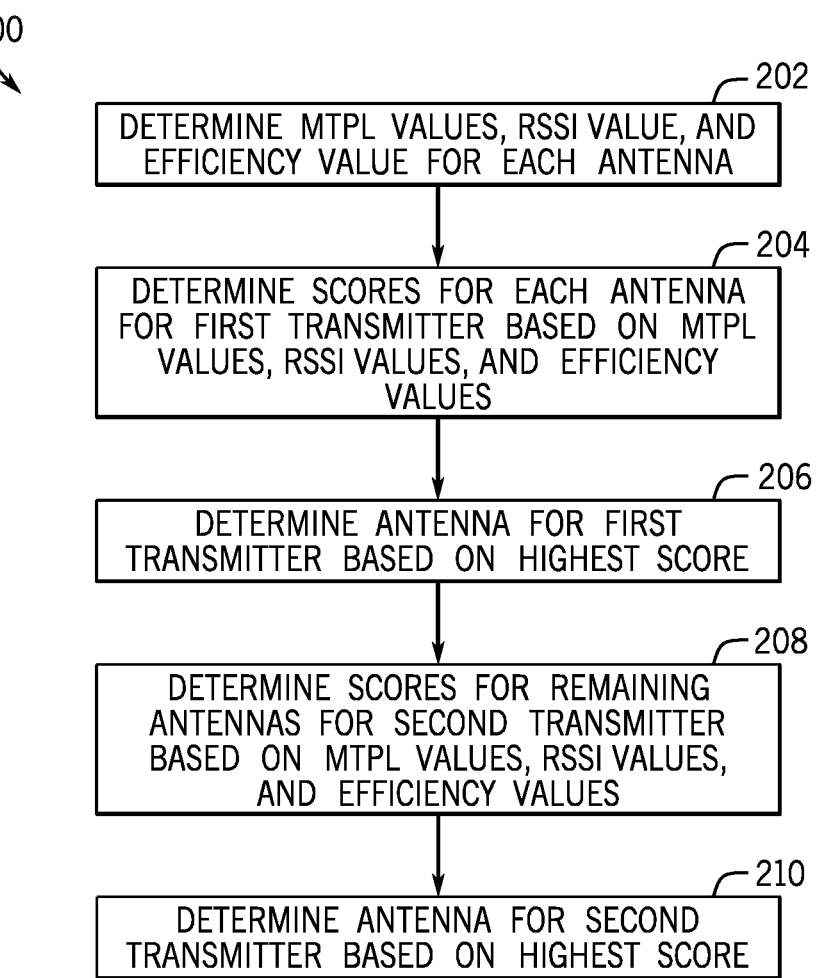

202

DETERMINE MTPL VALUES, RSSI VALUE, AND
EFFICIENCY VALUE FOR EACH ANTENNA

204

DETERMINE SCORES FOR EACH ANTENNA
FOR FIRST TRANSMITTER BASED ON MTPL
VALUES, RSSI VALUES, AND EFFICIENCY
VALUES

206

DETERMINE ANTENNA FOR FIRST
TRANSMITTER BASED ON HIGHEST SCORE

208

DETERMINE SCORES FOR REMAINING
ANTENNAS FOR SECOND TRANSMITTER
BASED ON MTPL VALUES, RSSI VALUES,
AND EFFICIENCY VALUES

210

DETERMINE ANTENNA FOR SECOND
TRANSMITTER BASED ON HIGHEST SCORE

FIG. 7

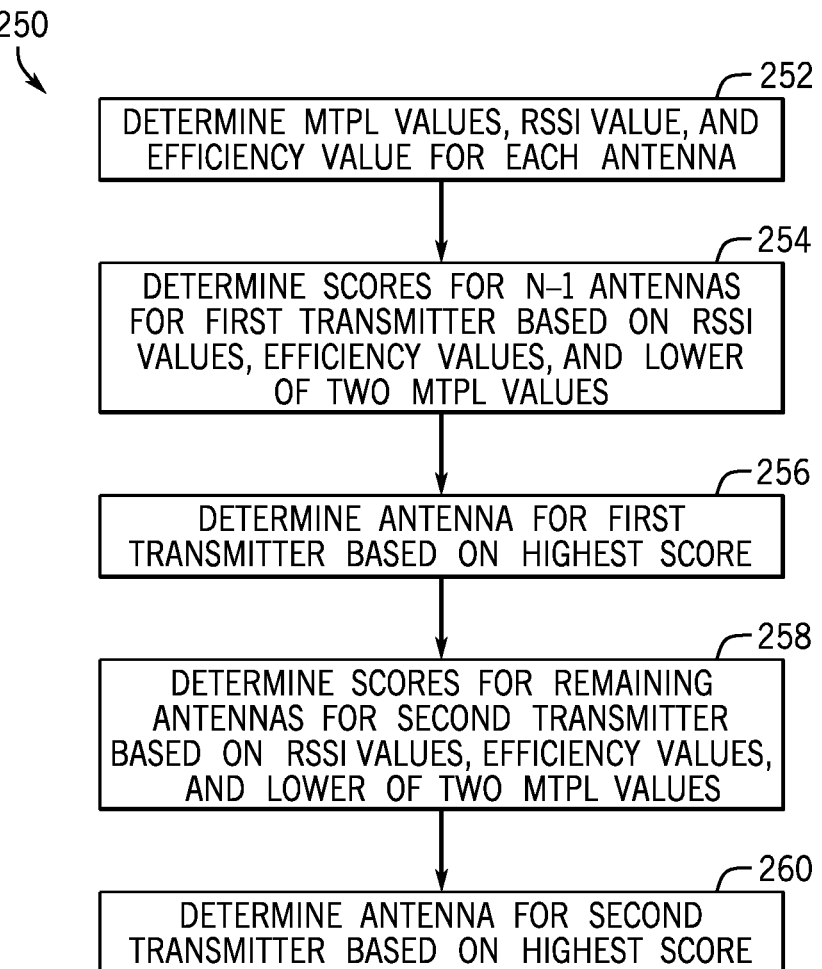

250

252
DETERMINE MTPL VALUES, RSSI VALUE, AND EFFICIENCY VALUE FOR EACH ANTENNA

254
DETERMINE SCORES FOR N–1 ANTENNAS FOR FIRST TRANSMITTER BASED ON RSSI VALUES, EFFICIENCY VALUES, AND LOWER OF TWO MTPL VALUES

256
DETERMINE ANTENNA FOR FIRST TRANSMITTER BASED ON HIGHEST SCORE

258
DETERMINE SCORES FOR REMAINING ANTENNAS FOR SECOND TRANSMITTER BASED ON RSSI VALUES, EFFICIENCY VALUES, AND LOWER OF TWO MTPL VALUES

260
DETERMINE ANTENNA FOR SECOND TRANSMITTER BASED ON HIGHEST SCORE

FIG. 8

SYSTEMS AND METHODS FOR TRANSMITTING RADIO FREQUENCY SIGNALS

BACKGROUND

The present disclosure relates generally to wireless communication, and more specifically to the transmission of wireless signals in wireless communication devices.

When transmitting wireless signals, transmitters or components thereof (e.g., amplifiers) may generate radio frequency (RF) signals, and antennas that receive the RF signals may transmit the RF signals. Due to the location of the antennas relative to the transmitters (or a particular component thereof, such as an amplifier) as well as the routing of the RF signals from the transmitters to the antennas, different antennas may have different maximum transmitted power limits (MTPLs) (e.g., the maximum possible transmission power of the transmitted RF signals). If multiple antennas are used to transmit RF signals and the antennas have different MTPLs, there may be an MTPL imbalance, which may result in the RF signals generated by the antennas having less power (e.g., relative to when MTPL is balanced), resulting in data (e.g., data packets transmitted in the form of the RF signals) being less resilient and more susceptible to not being received (e.g., by a base station or device receiving the RF signals).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes a first transmitter, a plurality of antennas communicatively coupled to the first transmitter, and processing circuitry communicatively coupled to the first transmitter. The processing circuitry is configured to determine a first antenna of the plurality of antennas for the first transmitter based on a plurality of maximum transmitted power limit (MTPL) values associated with the plurality of antennas and either a plurality of signal characteristic values associated with the plurality of antennas, a plurality of efficiency values associated with the plurality of antennas, or both the plurality of signal characteristic values and the plurality of efficiency values. The processing circuitry is also configured to cause the first transmitter to transmit a radio frequency (RF) signal to the first antenna.

In another embodiment, a method includes determining, via processing circuitry of an electronic device, a first antenna of a plurality of antennas of the electronic device for a first transmitter of the electronic device based on a plurality of maximum transmitted power limit (MTPL) values associated with the plurality of antennas and either a plurality of signal characteristic values associated with the plurality of antennas, a plurality of efficiency values associated with the plurality of antennas, or both the plurality of signal characteristic values and the plurality of efficiency values. The method also includes causing, via the processing circuitry, the first transmitter to transmit a radio frequency (RF) signal to the first antenna.

In yet another embodiment, a non-transitory computer-readable medium includes instructions that, when executed by processing circuitry of an electronic device, cause the processing circuitry to determine a first antenna of a plurality of antennas of the electronic device for a first transmitter of the electronic device and a second antenna of the plurality of antennas for a second transmitter of the electronic device based on a plurality of maximum transmitted power limit (MTPL) values associated with the plurality of antennas and either a plurality of signal characteristic values associated with the plurality of antennas, a plurality of efficiency values associated with the plurality of antennas, or both the plurality of signal characteristic values and the plurality of efficiency values. When executed, the instructions also cause the processing circuitry to cause the first transmitter to transmit a first radio frequency (RF) signal to the first antenna and the second transmitter to transmit a second RF signal to the second antenna.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 7 is a flowchart of a process for determining antenna(s) of the electronic device of FIG. 1 for transmission based on independent MTPL values, according to embodiment of the present disclosure; and FIG. 8 is flowchart of a process for determining antenna(s) of the electronic device of FIG. 1 for transmission based on combined MTPL values, according to embodiment of the present disclosure.

DETAILED DESCRIPTION OF SPECIFIC EMBODIMENTS

Figure 1:
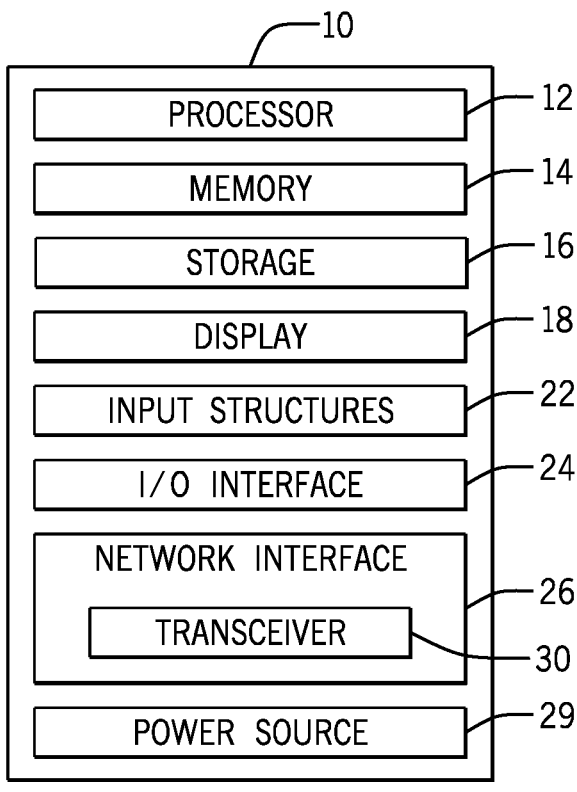
FIG. 1 is a block diagram of an electronic device, according to embodiments of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to the transmission of wireless signals in wireless communication devices using multiple antennas. When transmitting wireless signals, transmitters or components thereof (e.g., amplifiers) may generate radio frequency (RF) signals, and antennas that receive the RF signals may transmit the RF signals. Due to the location of the antennas relative to the transmitters (or a particular component thereof, such as an amplifier) as well as the routing of the RF signals from the transmitters to the antennas, different antennas may have different maximum transmitted power limits (MTPLs) (e.g., the maximum possible transmission power of the transmitted RF signals). If multiple antennas are used to transmit RF signals and the antennas have different MTPLs, there may be an MTPL imbalance, which may result in the RF signals generated by the antennas having less power (e.g., relative to when MTPL is balanced), resulting in data (e.g., data packets transmitted in the form of the RF signals) being less resilient and more susceptible to not being received (e.g., by a base station or device receiving the RF signals).

Embodiments herein provide various techniques to determine antenna or antennas to transmit RF signals based on MTPL values associated with the antennas. The techniques may also utilize other values, such as received signal strength (e.g., in the form of received signal strength indicator (RSSI) values) and/or efficiency values associated with the antennas. By utilizing MTPL values when determining the antennas utilized to transmit data, MTPL imbalances may be reduced, thereby improving the quality of RF signals transmitted by an electronic device.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, Long Term Evolution (LTE®) cellular network, Long Term Evolution License Assisted Access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
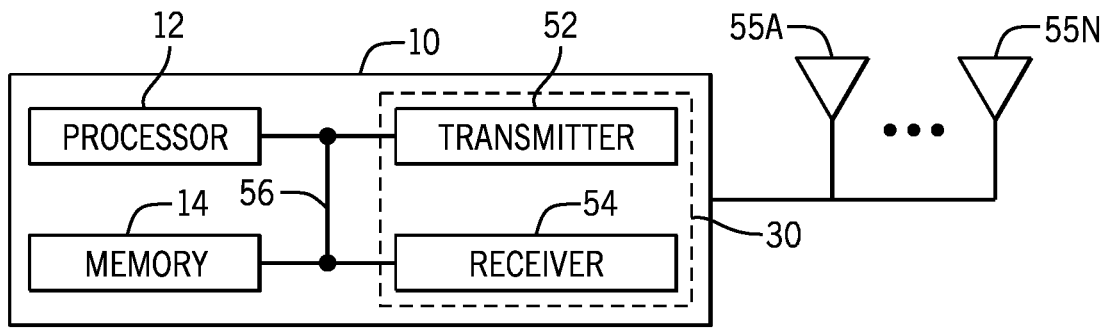
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figures 3, 4:
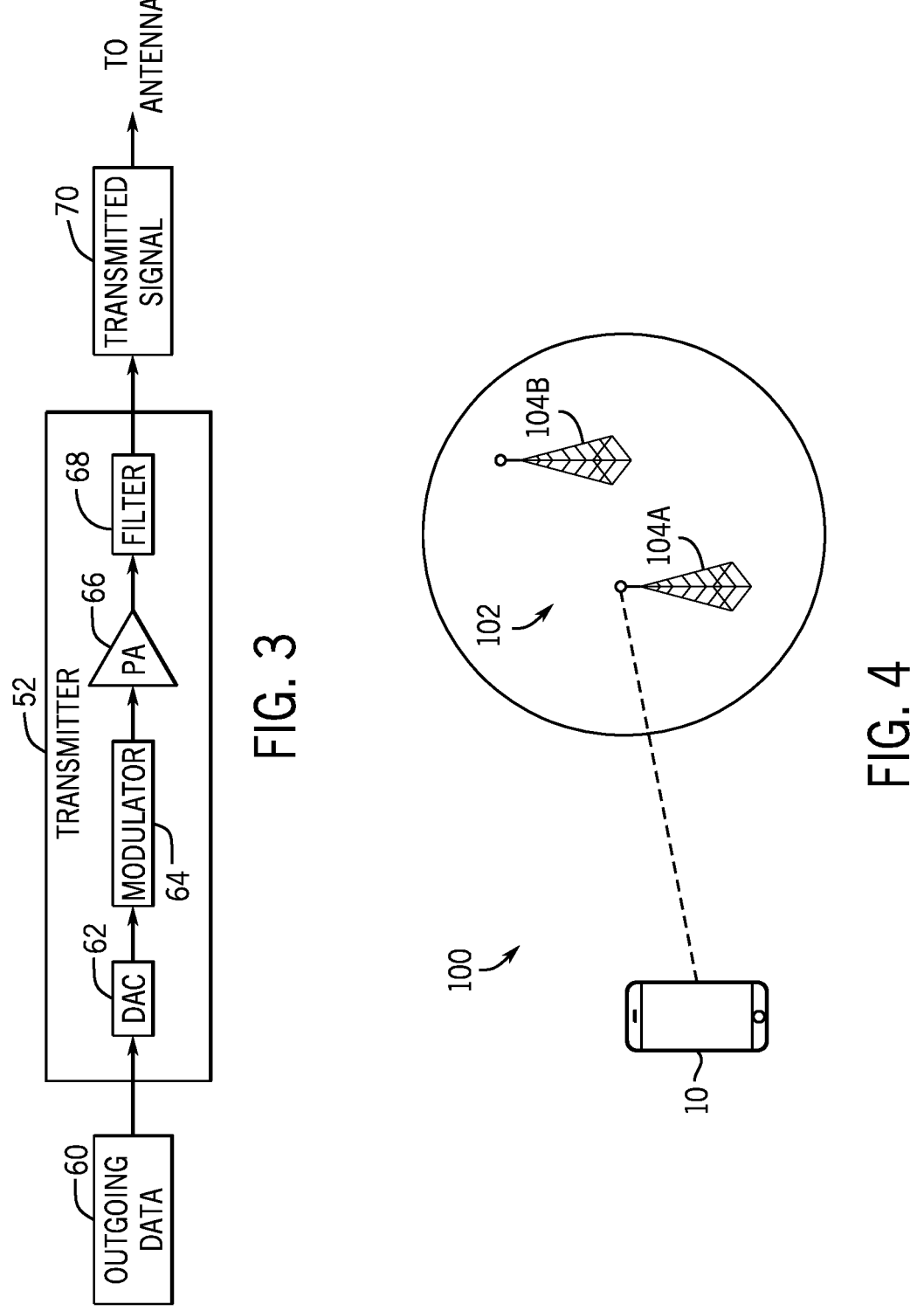
FIG. 3 is a schematic diagram of a transmitter of the electronic device of FIG. 1, according to embodiments of the present disclosure.
FIG. 4 is a schematic diagram of a communication system including the electronic device of FIG. 1 communicatively coupled to a wireless communication network supported by base stations, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE), and more specifically, a transmit front end (TXFE) of the electronic device 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

FIG. 4 is a schematic diagram of a communication system 100 including the electronic device 10 of FIG. 1, which can also be referred to as "user equipment" (UE), communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the electronic device 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the electronic device 10. Each of the base stations 104 may include at least some of the components of the electronic device 10 shown in FIGS. 1 and 2, including one or more processors 12, the memory 14, the storage 16, the transceiver 30, the transmitter 52, the receiver 54, and the associated circuitry shown in FIG. 3. It should be understood that while the present disclosure may use 5G/NR as an example specification or standard, the embodiments disclosed herein may apply to other suitable specifications or standards (e.g., such as the 4G/LTE specification). Moreover, the network 102 may include any suitable number of base stations 104 (e.g., one or more base stations 104, four or more base stations 104, ten or more base stations 104, and so on).

When communicating with the base station 104 (or multiple base stations 104) the electronic device 10 may transmit data to the base station(s) 104 or receive data from the base station(s) utilizing one or more of the antennas 55. In some cases, the electronic device 10 may transmit wireless signals indicative of characteristics of the electronic device 10, which may be utilized to determine how the electronic device 10 communicates with the base station 104. For instance, the electronic device 10 may transmit data using a physical uplink shared channel (PUSCH) indicative of capabilities of the electronic device 10, and/or a location of the electronic device 10. The base station 104 that receives the data may determine whether the electronic device 10 is near or far from the base station based on the received data. For example, the base station may determine that the electronic device is near (e.g., at a distance that is less than a threshold distance) or far (e.g., at a distance greater than the threshold distance) based on the signal strength of the wireless signals received from the electronic device 10, the quality of the wireless signals received from the electronic device 10, and/or the wireless signals themselves (e.g., when the wireless signals convey or indicate data or values such as signal strength (e.g., RSSI and/or reference signal received power (RSRP)) values, MTPL values, signal quality (e.g., signal-to-noise ratio (SNR) and/or reference signal received quality (RSRQ)) values, and/or a location of the electronic device 10). The base station 104 may transmit (e.g., via one or more wireless signals) an indication to the electronic device 10 indicative of whether the electronic device 10 is near or far from the base station 104. The base station 104 may also transmit signal strength values to the electronic device 10. The signal strength values may be antenna-specific and indicate how strong (e.g., in decibel-milliwatts (dBm)) a wireless signal transmitted by a given antenna 55 was or may be.

Figure 5:
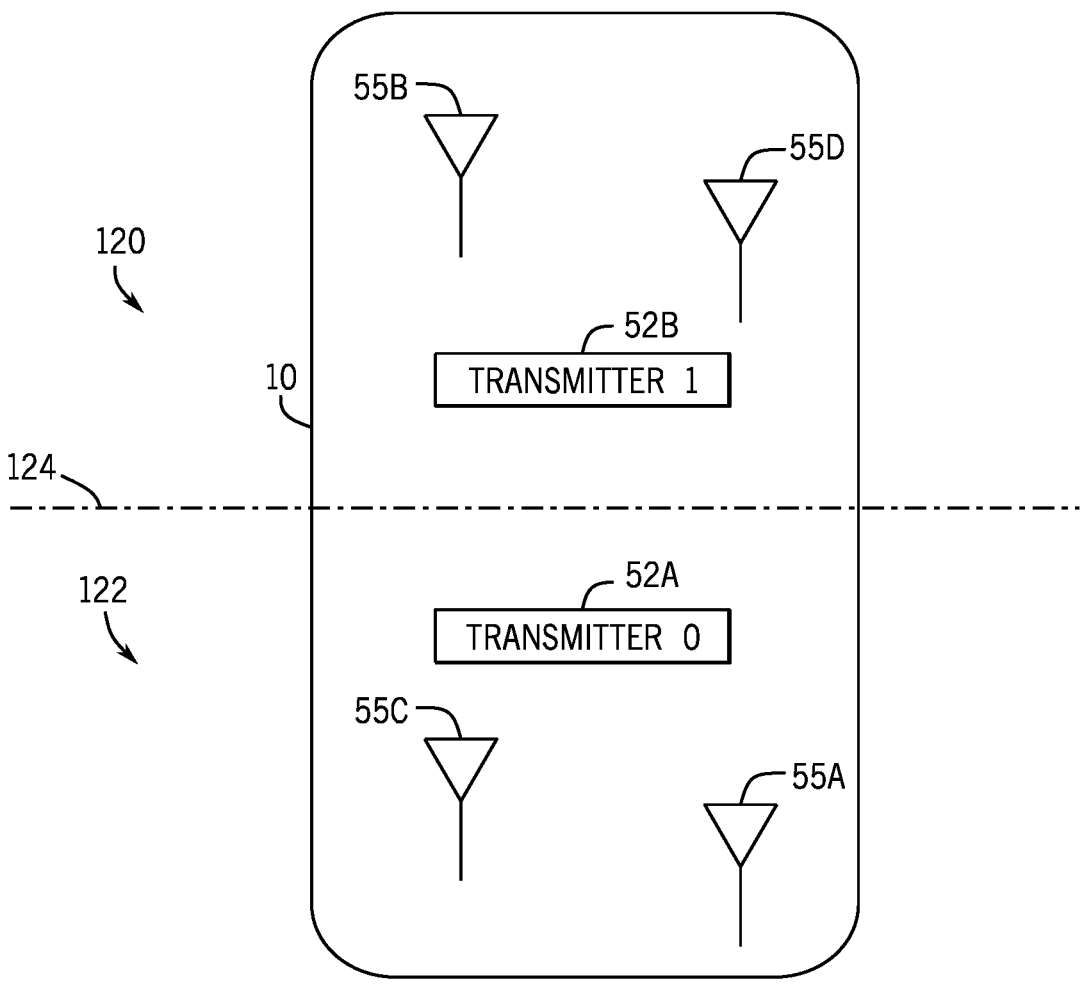
FIG. 5 is a schematic diagram of the electronic device of FIG. 1 including several transmitters and antennas, according to embodiments of the present disclosure.

Based at least in part on the indication received from the base station 104, the electronic device 10 (e.g., via the processor 12) may determine the antennas 55 to use, for instance, to transmit data to the base station 104. Bearing this in mind, FIG. 5 is a block diagram of an embodiment of the electronic device 10 in which the electronic device 10 includes four antennas 55: a first antenna 55A, a second antenna 55B, a third antenna 55C, and a fourth antenna 55D. Each of the antennas 55 (referring collectively to antennas 55A, 55B, 55C, 55D) may be communicatively coupled to transmitter 52A (e.g., a first transmitter) and transmitter 52B (e.g., a second transmitter) of the electronic device 10. The transmitters 52A, 52B may operate in a similar manner to, include the same components of, and perform the same functions as, the transmitter 52 as described above. Thus, the antennas 55 may receive signals transmitted by the transmitters 52A, 52B and transmit wireless signals corresponding to the received signals. It should be noted that while four antennas 55 and two transmitters 52 (referring collectively to the transmitter 52A and the transmitter 52B) are illustrated in FIG. 5, the techniques of the present disclosure may be utilized in systems and devices having multiple antennas 55 or both multiple antennas 55 and multiple transmitters 52. Thus, in other embodiments, the electronic device 10 may include two, three, or more than four antennas 55, and, in some embodiments, the electronic device 10 may include a single transmitter 52 or more than two transmitters 52. Additionally, it should be noted that the antennas 55 may be considered as logical groupings of two or more physical antennas. For example, in one embodiment, the first antenna 55A and the second antenna 55B could each be two physical antennas 55, the third antenna 55C could be three physical antennas 55, and the fourth antenna 55D could be a single physical antenna 55.

The electronic device 10 may be divided into an upper portion 120 and a lower portion 122 by a line 124. As illustrated, the transmitter 52A, first antenna 55A, and third antenna 55C are located in the lower portion 122, while the transmitter 52B, second antenna 55B, and the fourth antenna 55D are located in the upper portion 120. The transmitters 52A, 52B or components thereof (e.g., amplifiers) may generate RF signals, and the antennas 55 that receive the RF signals may wirelessly transmit the RF signals. Due to the location of the antennas 55 relative to the transmitters 52A, 52B (or a particular component thereof, such as an amplifier) as well as the routing of the RF signals from the transmitters 52A, 52B to the antennas 55, different antennas 55 may have different maximum transmitted power limits (MTPLs) (e.g., the maximum possible transmission power of the transmitted RF signals). If multiple antennas 55 are used to transmit RF signals and the antennas have different MTPLs, there may be an MTPL imbalance, which may result in the RF signals generated by the antennas 55 having less power (e.g., relative to when MTPL is balanced), resulting in data (e.g., data packets transmitted in the form of the RF signals) being less resilient and more susceptible to not being received (e.g., by a base station 104 or device receiving the RF signals). For instance, because the first antenna 55A and the third antenna 55C are located in the lower portion 122 with the transmitter 52A, the first antenna 55A and the third antenna 55C may have higher MTPLs when transmitting RF signals received from the transmitter 52A that is also located in the lower portion 122 relative to when transmitting RF signals received from the transmitter 52B that is located in the upper portion 120. Conversely, because the second antenna 55B and the fourth antenna 55D are located in the upper portion 120 with the transmitter 52B, the second antenna 55B and the fourth antenna 55D may have higher MTPLs when transmitting RF signals received from the transmitter 52B relative to when transmitting RF signals received from the transmitter 52A that is located in the lower portion 122. Accordingly, power loss in the signals transmitted by the wireless device 10 may occur when using an antenna 55 to transmit signals from a transmitter 52 located in a different portion (e.g., upper portion 120 or lower portion 122) than the antenna 55.

As described below, the electronic device 10 (e.g., using the processor 12) may determine antenna(s) 55 to transmit RF signals based on several factors, including, but not limited to, whether the electronic device 10 is near or far from the base station 104 (e.g., as indicated in the indication received from the base station 104) and MTPL values associated with the antennas 55. By utilizing MTPL values when selecting which antennas are utilized to transmit data, MTPL imbalances may be reduced, thereby determining the quality of RF signals transmitted by the electronic device 10. As also discussed below, signal characteristic values associated with the antennas, efficiency values associated with the antennas, or both the signal characteristic values and the efficiency values may also be utilized when determining which antenna(s) to utilize to transmit data.

Figure 6:
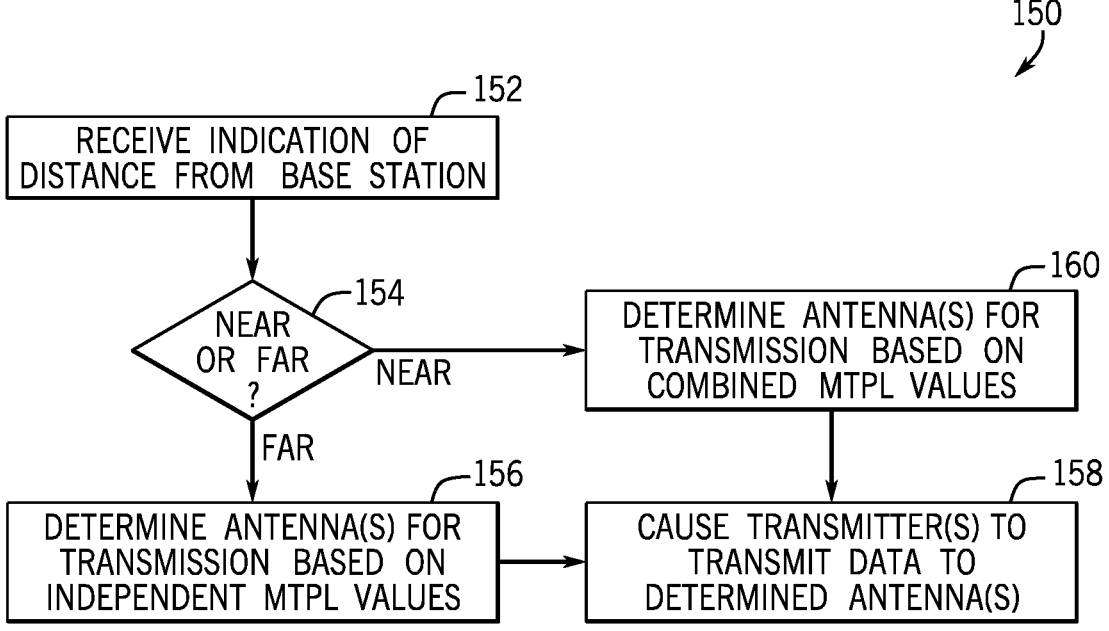
FIG. 6 is a flowchart of a process for determining antenna(s) of the electronic device of FIG. 1 for transmission, according to embodiment of the present disclosure.

Bearing this in mind, FIG. 6 is a flowchart of a process 150 for the electronic device 10 to determine antennas 55 to transmit data (e.g., RF signals) and to transmit the data utilizing the determined antennas 55. Any suitable device (e.g., a controller) that may control components of the electronic device 10, such as the processor 12, may perform the process 150. In some embodiments, the process 150 may be implemented by executing instructions stored in a tangible, non-transitory, computer-readable medium, such as the memory 14 or storage 16, using the processor 12. For example, the process 150 may be performed at least in part by one or more software components, such as an operating system of the electronic device 10, one or more software applications of the electronic device 10, and the like. While the process 150 is described using steps in a specific sequence, it should be understood that the present disclosure contemplates that the described steps may be performed in different sequences than the sequence illustrated, and certain described steps may be skipped or not performed altogether. The process 150 generally includes receiving an indication of distance from the base station 104 (process block 152) and determining whether the electronic device 10 is near or far from the base station (decision block 154). When the electronic device 10 is determined to be far from the base station 104, the process 150 includes determining antenna(s) 55 to utilize for transmission based on independent MTPL values (process block 156) and causing the transmitter 52 (or transmitters 52A, 52B) to transmit data using the determined antenna(s) 55 (process block 158). When the electronic device 10 is determined to be near the base station 104, the process 150 includes determining antenna(s) 55 to utilize for transmission based on combined MTPL values (process block 160) and causing the transmitter 52 (or transmitters 52A, 52B) to transmit data using the determined antenna(s) 55 (process block 158).

In process block 152, the electronic device 10 (e.g., via one or more of the antennas 55 as well as the processor 12) may receive an indication of distance from the base station 104. As noted above, the electronic device 10 may transmit wireless signals indicative of characteristics of the electronic device 10, which may be utilized to determine how the electronic device 10 communicates with the base station 104. The base station 104 that receives the data may determine whether the electronic device 10 is near or far from the base station based on the received data. For example, the base station may determine that the electronic device is near (e.g., at a distance that is less than a threshold distance) or far (e.g., at a distance greater than the threshold distance) based on the signal characteristics (e.g., signal strength and/or signal quality) of the wireless signals received from the electronic device 10, and/or the wireless signals themselves (e.g., when the wireless signals convey or indicate data or values such as RSSI values, MTPL values, a location of the electronic device 10). The base station 104 may transmit (e.g., via one or more wireless signals) an indication to the electronic device 10 indicative of whether the electronic device 10 is near or far from the base station 104. Accordingly, the electronic device 10 may receive an indication from the base station 104 of whether the electronic device 10 is within a threshold distance of the base station 104 (e.g., near the base station 104) or farther than the threshold distance from the base station 104 (e.g., far from the base station 104). It should also be noted that the indication received at process block 152 may also be indicative of one or more signal characteristic (e.g., RSSI) values.

In decision block 154, the processor 12 may determine whether the electronic device 10 is near the base station or far from the base station 104 based on the indication received from the base station at process block 152. For instance, if the received indication is indicative of the electronic device 10 being near the base station 104 (e.g., within the threshold distance of the base station 104), the processor 12 may determine that the electronic device 10 is near the base station 104. Conversely, if the received indication is indicative of the electronic device 10 being far from the base station 104 (e.g., outside the threshold distance of the base station 104), the processor 12 may determine that the electronic device 10 is far from the base station 104. Additionally, in some embodiments, the processor 12 may determine whether the electronic device 10 is near the base station 104 or far from the base station 104 based on a comparison of a value provided by the base station 104 in the indication, such as an RSSI value, to a threshold value. In such embodiment, when the value is greater than (or equal to) the threshold, the processor 12 may determine that the electronic device 10 is near the base station 104, whereas when the value is less than (or equal to) the threshold, the processor 12 may determine that the electronic device 10 is far from the base station 104.

If at decision block 154 the processor 12 determines that the electronic device 10 is far from the base station 104, in process block 156, the processor 12 may determine antenna(s) 55 of the electronic device 10 to use for transmission based on independent MTPL values. To help elaborate, FIG. 7 is a flowchart of a process 200 for determining the antenna(s) 55 of the electronic device 10 to use for transmission based on independent MTPL values, according to embodiments of the present disclosure. As such, process block 156 of the process 150 may be performed by performing the process 200. Any suitable device (e.g., a controller) that may control components of the electronic device 10, such as the processor 12, may perform the process 200. In some embodiments, the process 200 may be implemented by executing instructions stored in a tangible, non-transitory, computer-readable medium, such as the memory 14 or storage 16, using the processor 12. For example, the process 200 may be performed at least in part by one or more software components, such as an operating system of the electronic device 10, one or more software applications of the electronic device 10, and the like. While the process 200 is described using steps in a specific sequence, it should be understood that the present disclosure contemplates that the described steps may be performed in different sequences than the sequence illustrated, and certain described steps may be skipped or not performed altogether.

In process block 202, the processor 12 may determine MTPL values, signal characteristic (e.g., RSSI) values, and efficiency values for each antenna 55 of the electronic device 10. In other words, the processor 12 may determine an RSSI value, an efficiency value, and one or more MTPL values for each antenna 55 of the electronic device 10 (or, in other embodiments, for at least two antennas 55). The processor 12 may determine the MTPL values and the efficiency values by reading the values from the memory 14 or the storage 16. For example, the MTPL values and the efficiency values may be included in a look-up table (LUT) or several LUTs accessible to the processor 12, and the processor 12 may read the MTPL values and the efficiency values from the LUT(s). The RSSI values may be received from the base station 104 (e.g., in the indication received at process block 152) and/or read from the LUT(s).

When performing the process 200, the MTPL values may include independent MTPL values, meaning the values may be configured for or correspond to a single antenna 55 and not take into account another antenna 55. An MTPL value may also be determined for each antenna 55 and for each transmitter 52. Thus, an antenna 55 may have multiple MTPL values for electronic devices that include more than one transmitter 52 (or amplifier that amplifies RF signals). For instance, referring briefly to FIG. 5, the processor 12 may determine two independent MTPL values for each of the antennas 55 (referring collectively to antennas 55A, 55B, 55C, 55D): one associated with the transmitter 52A and another associated with the transmitter 52B. Thus, the processor 12 may determine eight MTPL values at process block 202 for the embodiment of the electronic device 10 illustrated in FIG. 5.

Returning to FIG. 7 and the discussion of the process 200, in process block 204, the processor 12 may determine, based on the values determined at process block 202, a score for each antenna 55 (or at least two antennas 55) associated with transmitting RF signals generated by the first transmitter 52A. In one embodiment, the score for an antenna 55 may be equal to the MTPL value for the antenna 55 that is associated with the first transmitter 52A. Thus, in such an embodiment, the processor 12 may not utilize RSSI values or efficiency values to determine the scores. In another embodiment, the processor 12 may determine the scores based on the MTPL value for the antenna 55 that is associated with the first transmitter 52A and the efficiency value for the antenna 55, a signal characteristic (e.g., RSSI) value for the antenna 55, or both the efficiency value and the signal characteristic value for the antenna 55. For example, in an embodiment in which scores are determined based on the MTPL value for the antenna 55 that is associated with the first transmitter 52A, the RSSI value associated with the antenna 55, and the efficiency value associated with the antenna 55, the processor 12 may determine the score for the antenna 55 by adding the MTPL value for the antenna 55 that is associated with the first transmitter 52A to the efficiency value for the antenna 55 and the RSSI value for the antenna 55. Thus, at process block 204, the processor 12 may determine a score that is associated with the first transmitter 52A for each antenna 55 based on the values determined at process block 202.

In process block 206, the processor 12 may determine an antenna 55 for the first transmitter 52A based on the highest score of the scores determined at process block 204. In other words, the processor 12 may determine which score determined at process block 204 is the highest, and processor 12 may determine that the antenna 55 associated with the highest score is the antenna 55 to utilize to transmit RF signals generated by the transmitter 52A.

In process block 208, the processor 12 may determine scores associated with the second transmitter 52B for the remaining antennas 55. In other words, the processor 12 may determine scores for the antennas 55 that were not selected at process block 206. The scores determined in process block 208 may be determined in the same manner as the scores determined in process block 204, but the scores determined in process block 208 may be determined using MTPL values associated with the second transmitter 52B. Thus, the scores determined at process block 208 may be determined based solely on the MTPL values associated with the second transmitter 52B in some embodiments, whereas in other embodiments, the processor 12 may determine the scores based on the MTPL values associated with the second transmitter 52B as well as the signal characteristic (e.g., RSSI) values, the efficiency values, or both the signal characteristic (e.g., RSSI) values and the efficiency values.

In process block 210, the processor 12 may determine an antenna 55 for the second transmitter 52B based on the highest score of the scores determined at process block 208. In other words, the processor 12 may determine which score determined at process block 208 is the highest, and processor 12 may determine that the antenna 55 associated with the highest score is the antenna 55 to utilize to transmit RF signals generated by the transmitter 52B. Thus, by performing the process 200, the processor 12 may determine which antenna(s) to utilize to transmit wireless signals based at least in part on MTPL values for the antennas 55, which may result in higher signal strength of the wireless signals received by the base station 104.

Returning to FIG. 6 and the discussion of the process 150, in process block 158, the processor 12 may cause either or both of the transmitters 52A, 52B to transmit data (e.g., in the form of one or more RF signals) to the antenna(s) 55 determined at process block 156 (e.g., by performing the process 200 of FIG. 7). Thus, when the electronic device 10 is determined to be far from the base station 104 (at decision block 154), the processor 12 may determine the antenna(s) 55 to utilize (at process block 156), and send RF signals generated by one or more transmitters 52 using the determined antenna(s) 55 (at process block 158).

However, if at decision block 154, the processor 12 determines that the electronic device 10 is near the base station 104, in process block 160, the processor 12 may determine antenna(s) 55 of the electronic device 10 to use for transmission based on combined MTPL values. To help elaborate, FIG. 8 is a flowchart of a process 250 for determining the antenna(s) 55 of the electronic device 10 to use for transmission based on combined MTPL values, according to embodiments of the present disclosure. As such, process block 160 of the process 150 may be performed by performing the process 250. As described below, the MTPL values utilized in the process 250 may be the same as those utilized in the process 200, but the process 250 may select one MTPL value from multiple MTPL values when determining scores for antennas 55. Any suitable device (e.g., a controller) that may control components of the electronic device 10, such as the processor 12, may perform the process 250. In some embodiments, the process 250 may be implemented by executing instructions stored in a tangible, non-transitory, computer-readable medium, such as the memory 14 or storage 16, using the processor 12. For example, the process 250 may be performed at least in part by one or more software components, such as an operating system of the electronic device 10, one or more software applications of the electronic device 10, and the like. While the process 250 is described using steps in a specific sequence, it should be understood that the present disclosure contemplates that the described steps may be performed in different sequences than the sequence illustrated, and certain described steps may be skipped or not performed altogether.

In process block 252, the processor 12 may determine MTPL values, signal characteristic (e.g., RSSI) values, and efficiency values for each antenna 55 of the electronic device 10 as described above with respect to process block 202. In other words, the processor 12 may determine an RSSI value, an efficiency value, and one or more MTPL values for each antenna 55 of the electronic device 10 (or, in other embodiments, for at least two antennas 55). The processor 12 may determine the MTPL values and the efficiency values by reading the values from the memory 14 or the storage 16. For example, the MTPL values and the efficiency values may be included in a look-up table (LUT) or several LUTs accessible to the processor 12, and the processor 12 may read the MTPL values and the efficiency values from the LUT(s). The RSSI values may be received from the base station 104 (e.g., in the indication received at process block 152) and/or read from the LUT(s).

When performing process block 252, the MTPL values may include independent MTPL values, meaning the values may be for or based on a single antenna 55 and not take into account or be based on another antenna 55. However, as described below, a single MTPL value, which may be referred to as a "combined" MTPL value, may be selected from multiple MTPL values when determining scores for antennas 55. Thus, a "combined" MTPL value may include a single MTPL value that is selected from multiple MTPL values (e.g., multiple independent MTPL values), and thus may take into account or be based on multiple antennas 55. An MTPL value may also be determined for each antenna 55 and for each transmitter 52. Thus, an antenna 55 may have multiple MTPL values for electronic devices that include more than one transmitter 52 (or amplifier that amplifies RF signals). For instance, referring briefly to FIG. 5, the processor 12 may determine two independent MTPL values for each of the antennas 55 (referring collectively to antennas 55A, 55B, 55C, 55D): one associated with the transmitter 52A and another associated with the transmitter 52B. Thus, the processor 12 may determine eight MTPL values at process block 202 for the embodiment of the electronic device 10 illustrated in FIG. 5.

Returning to FIG. 8 and the discussion of the process 250, in process block 254, the processor 12 may determine, based on the values determined at process block 252, a score associated with transmitting RF signals generated by a first transmitter (e.g., transmitter 52B) for n−1 antennas 55, where n is the total number of antennas 55 of the electronic device 10 or at least three. In one embodiment, the score for an antenna 55 may be equal to the minimum value of two MTPL values: a first MTPL value for a first antenna 55 (e.g., antenna 55A) associated with the transmitter 52A and a second MTPL value associated with another antenna 55 (e.g., one of antennas 55B, 55C, 55D) that is associated with the transmitter 52B. Thus, in such an embodiment, the processor 12 may not utilize RSSI values or efficiency values to determine the scores. In another embodiment, the processor 12 may determine each score based the minimum value of two MTPL values as well as the efficiency value for the antenna 55 (e.g., one of antennas 55B, 55C, 55D), a signal characteristic (e.g., RSSI) value for the antenna 55 (e.g., one of antennas 55B, 55C, 55D), or both the efficiency value and the signal characteristic (e.g., RSSI) value. For example, in an embodiment in which scores are determined based on the minimum of two MTPL values, the RSSI value associated with the antenna 55, and the efficiency value associated with the antenna 55, the processor 12 may determine the score for the antenna 55B by adding the efficiency value for the antenna 55B and the RSSI value for the antenna 55B to the lower MTPL value of the MTPL value for the antenna 55A that is associated with the first transmitter 52A and the MTPL value of the antenna 55B that is associated with the transmitter 52B. Thus, at process block 204, the processor 12 may determine a score that is associated with the transmitter 52B for antennas 55 based on the values determined at process block 202.

To help elaborate on determining the scores, an example is provided. The values to be utilized in this example, which may be the values determined at process block 202, are provided below in Table 1. In Table 1, "Tx0" corresponds to transmitter 52A, "Tx1" corresponds to transmitter 52B, and "dBm" is an abbreviation for decibel-milliwatts.

TABLE 1

|  | Antenna 55A | Antenna 55B | Antenna 55C | Antenna 55D |
|---|---|---|---|---|
| MTPL$_{Tx0}$ (dBm) | 28 | 25 | 27 | 24 |
| MTPL$_{Tx1}$ (dBm) | 24 | 28 | 25 | 27 |
| RSSI (dBm) | −85 | −86 | −85 | −89 |
| Efficiency (dBm) | −10 | −10 | −10 | −10 |

In the example, when performing process block 204, the processor 12 may utilize the values of Table 1 (which the processor 12 may have determined in process block 202). For example, the processor 12 may determine a score for each of antenna 55B, antenna 55C, and antenna 55D. In an embodiment in which scores are determined based on the minimum of two MTPL values, an RSSI value, and an efficiency value, the processor 12 may determine the score for the antenna 55B by adding the efficiency value for the antenna 55B (e.g., −10) and the RSSI value for the antenna 55B (e.g., −86) to the lower MTPL value of the MTPL value for the antenna 55A that is associated with the transmitter 52A (e.g., 28) and the MTPL value of the antenna 55B that is associated with the transmitter 52B (e.g., 28). In this case, because the MTPL values are equal, either may be used. Thus, the score for antenna 55B would be negative sixty-eight (−68). The processor 12 may determine the score for the antenna 55C by adding the efficiency value for the antenna 55C (e.g., −10) and the RSSI value for the antenna 55C (e.g., −85) to the lower MTPL value of the MTPL value for the antenna 55A that is associated with the transmitter 52A (e.g., 28) and the MTPL value of the antenna 55B that is associated with the transmitter 52B (e.g., 25). Thus, the score for antenna 55C would be negative seventy (−70). The processor 12 may determine the score for the antenna 55D by adding the efficiency value for the antenna 55D (e.g., −10) and the RSSI value for the antenna 55D (e.g., −89) to the lower MTPL value of the MTPL value for the antenna 55A that is associated with the transmitter 52A (e.g., 28) and the MTPL value of the antenna 55D that is associated with the transmitter 52B (e.g., 27). Thus, the score for the antenna 55D would be negative seventy-two (−72).

Continuing with the discussion of the process 250, in process block 256, the processor 12 may determine an antenna 55 for the transmitter 52B based on the highest score of the scores determined at process block 254. In other words, the processor 12 may determine which score determined at process block 254 is the highest, and processor 12 may determine that the antenna 55 associated with the highest score is the antenna 55 to utilize to transmit RF signals generated by the transmitter 52B. To continue with the example above, the processor 12 may determine that the highest score is negative sixty-eight and that such score is associated with the second antenna 55B. Thus, in this example, the processor 12 may determine the second antenna 55B in process block 256

In process block 258, the processor 12 may determine scores associated with the transmitter 52A for the remaining antennas 55. In other words, the processor 12 may determine scores for the antennas 55 that were not selected at process block 256. The scores determined in process block 258 may be determined in a similar manner as the scores determined in process block 254, though the MTPL value utilized for the score may be the minimum of two MTPL values: a first MTPL value for an antenna 55 (e.g., one of the antennas 55 not determined at process block 256) associated with the transmitter 52A; and a second MTPL value associated with the transmitter 52B for the antenna 55 determined at process block 256. Thus, the scores determined at process block 258 may be determined based solely on the minimum value of two MTPL values in some embodiments, whereas in other embodiments, the processor 12 may determine the scores based on the minimum MTPL value of two MTPL values as well as the signal characteristic (e.g., RSSI) values, the efficiency values, or both the signal characteristic (e.g., RSSI) values and the efficiency values.

Continuing with the example above in which the second antenna 55B is determined at process block 256, at process block 258, the processor 12 may determine scores for the first antenna 55A, the third antenna 55C, and the fourth antenna 55D utilizing the minimum MTPL value of two MTPL values as well as RSSI values and efficiency values. As such, the processor 12 may determine the score for the antenna 55A by adding the efficiency value for the antenna 55A (e.g., –10) and the RSSI value for the antenna 55A (e.g., –85) to the lower MTPL value of the MTPL value for the antenna 55A that is associated with the transmitter 52B (e.g., 24) and the MTPL value of the antenna 55B that is associated with the transmitter 52A (e.g., 28). Thus, the score for antenna 55A would be negative sixty-seven (–67). The processor 12 may determine the score for the antenna 55C by adding the efficiency value for the antenna 55C (e.g., –10) and the RSSI value for the antenna 55C (e.g., –85) to the lower MTPL value of the MTPL value for the antenna 55C that is associated with the transmitter 52A (e.g., 27) and the MTPL value of the antenna 55B that is associated with the transmitter 52B (e.g., 28). Thus, the score for antenna 55C would be negative sixty-eight (–68). The processor 12 may determine the score for the antenna 55D by adding the efficiency value for the antenna 55D (e.g., –10) and the RSSI value for the antenna 55D (e.g., –89) to the lower MTPL value of the MTPL value for the antenna 55D that is associated with the transmitter 52A (e.g., 24) and the MTPL value of the antenna 55A that is associated with the transmitter 52B (e.g., 28). Thus, the score for the antenna 55D would be negative seventy-five (–75).

In process block 260, the processor 12 may determine an antenna 55 for the second transmitter 52A based on the highest score of the scores determined at process block 258. In other words, the processor 12 may determine which score determined at process block 258 is the highest, and processor 12 may determine that the antenna 55 associated with the highest score is the antenna 55 to utilize to transmit RF signals generated by the transmitter 52A. As such, in the example discussed above, the processor 12 may determine that the highest score is negative sixty-seven and that the first antenna 55A is the antenna 55 with the highest score. Thus, by performing the process 250, the processor 12 may determine that the antenna 55A should be used to transmit RF signals received from the transmitter 52A and that the antenna 55B should be used to transmit RF signals received from the transmitter 52B. Thus, by performing the process 200, the processor 12 may determine which antenna(s) to utilize to transmit wireless signals based at least in part on MTPL values for the antennas 55, which may result in higher signal strength of the wireless signals received by the base station 104.

Returning to FIG. 6 and the discussion of the process 150, in process block 158, the processor 12 may cause either or both of the transmitters 52A, 52B to transmit data (e.g., in the form of one or more RF signals) to the antenna(s) 55 determined at process block 160 (e.g., by performing the process 250 of FIG. 8). Thus, when the electronic device 10 is determined to be near the base station 104 (at decision block 154), the processor 12 may determine which antenna(s) 55 to utilize (at process block 160), and the determined antenna(s) 55 may be utilized to send RF signals generated by one or more transmitters 52 (at process block 158).

By utilizing the techniques described herein, the electronic device 10 may transmit data (e.g., wireless signals) to other electronic devices or systems (e.g., base stations 104) with higher resiliency and power (e.g., relative to other techniques that do not account for MTPL values). Thus, the techniques of the present disclosure enable electronic devices to more robustly communicate wirelessly.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
a first transmitter;
a second transmitter;
a first plurality of antennas communicatively coupled to the first transmitter;
a second plurality of antennas communicatively coupled to the second transmitter; and processing circuitry communicatively coupled to the first transmitter, the processing circuitry configured to select a first antenna of the first plurality of antennas associated with the first transmitter based on a lowest maximum transmitted power limit (MTPL) value of at least a first MTPL value of a plurality of MTPL values associated with the first antenna and the first transmitter and a second MTPL value of the plurality of MTPL values associated with another antenna and the second transmitter, and cause the first transmitter to transmit a radio frequency (RF) signal to the first antenna.

2. The electronic device of claim 1, wherein the processing circuitry is configured to determine the first antenna of the first plurality of antennas based on the lowest MTPL value, a plurality of received signal strength indicator (RSSI) values, and a plurality of efficiency values.

3. The electronic device of claim 1, wherein the processing circuitry is communicatively coupled to the second transmitter and configured to receive, from a base station, an indication of whether the electronic device is within a threshold distance of the base station, determine the first antenna of the first plurality of antennas and a second antenna of the second plurality of antennas based on the indication indicating that the electronic device is within the threshold distance of the base station, and cause the second transmitter to transmit a second RF signal to the second antenna.

4. The electronic device of claim 3, wherein the processing circuitry is configured to determine the first antenna by determining a plurality of first scores for the first plurality of antennas based on the plurality of MTPL values, a plurality of signal characteristic values, and a plurality of efficiency values, and selecting the first antenna from the first plurality of antennas based on a highest score of the plurality of first scores, and determine the second antenna by determining a plurality of second scores for the second plurality of antennas based on the plurality of MTPL values, the plurality of signal characteristic values, and the plurality of efficiency values, and selecting the second antenna based on a highest score of the plurality of second scores.

5. The electronic device of claim 4, wherein the processing circuitry is configured to determine a respective score of the plurality of first scores for each respective antenna of the first plurality of antennas by determining the lowest MTPL value from the first MTPL value of the plurality of MTPL values associated with the respective antenna and the first transmitter and the second MTPL value of the plurality of MTPL values associated with another antenna of the second plurality of antennas and the second transmitter, and adding the lowest MTPL value, a signal characteristic value of the plurality of signal characteristic values associated with the respective antenna, and an efficiency value of the plurality of efficiency values associated with the respective antenna.

6. The electronic device of claim 5, wherein the processing circuitry is configured to determine a respective score of the plurality of second scores for each respective antenna of the second plurality of antennas by determining a second lowest MTPL value from a third MTPL value of the plurality of MTPL values associated with the respective antenna of the second plurality of antennas and the second transmitter and a fourth MTPL value of the plurality of MTPL values associated with the first antenna of the first plurality of antennas and the first transmitter, and adding the second lowest MTPL value, a second signal characteristic value of the plurality of signal characteristic values associated with the respective antenna of the second plurality of antennas, and a second efficiency value of the plurality of efficiency values associated with the respective antenna of the second plurality of antennas.

7. The electronic device of claim 1, comprising the second transmitter, wherein the processing circuitry is communicatively coupled to the second transmitter and configured to receive, from a base station, an indication of whether the electronic device is outside a threshold distance of the base station, determine the first antenna of the first plurality of antennas and a second antenna of the second plurality of antennas based on the indication indicating that the electronic device is outside of the threshold distance of the base station, and cause the second transmitter to transmit a second RF signal to the second antenna.

8. The electronic device of claim 7, wherein the processing circuitry is configured to determine the first antenna by determining a plurality of first scores for the first plurality of antennas based on the lowest MTPL value of at least the first MTPL value of the plurality of MTPL values, a plurality of signal characteristic values, and a plurality of efficiency values, and selecting the first antenna from the first plurality of antennas based on a highest score of the plurality of first scores, and determine the second antenna by determining, based on a second lowest MTPL value of at least the first MTPL value of the plurality of MTPL values, the plurality of signal characteristic values, and the plurality of efficiency values, a plurality of second scores for a subset of the second plurality of antennas that excludes the first antenna, and selecting the second antenna based on a highest score of the plurality of second scores.

9. The electronic device of claim 1, wherein the processing circuitry is configured to select the first antenna of the first plurality of antennas associated with the first transmitter by adding the lowest MTPL value, a signal characteristic value of a plurality of signal characteristic values associated with the first antenna, and an efficiency value of a plurality of efficiency values associated with the first antenna.

10. The electronic device of claim 1, wherein the processing circuitry is configured to select the first antenna of the first plurality of antennas associated with the first transmitter by adding a lowest MTPL value associated with one or more additional antennas, a signal characteristic value of a plurality of signal characteristic values associated with the one or more additional antennas, and an efficiency value of a plurality of efficiency values associated with the one or more additional antennas; comparing the sum associated with the first antenna to one or more sums associated with the one or more additional antennas; and selecting the first antenna based on associating the first antenna with a highest sum.

11. A method, comprising:

selecting, via processing circuitry of an electronic device, a first antenna of a plurality of antennas of the electronic device for a first transmitter of the electronic device based on a lowest MTPL value from a first MTPL value of a plurality of MTPL values associated with the first antenna and the first transmitter and a second MTPL value of the plurality of MTPL values associated with another antenna of the plurality of antennas and a second transmitter; and transmitting, by the first transmitter, a radio frequency (RF) signal to the first antenna.

12. The method of claim 11, further comprising:

selecting. via the processing circuitry, the first antenna based on a plurality of signal characteristic values comprising a plurality of received signal strength indicator (RSSI) values:

receiving, via the processing circuitry and from a base station, an indication of whether the electronic device is within a threshold distance of the base station; and determining, via the processing circuitry, the first antenna based on the indication.

13. The method of claim 12, wherein when the indication is indicative of the electronic device being within the threshold distance of the base station, determining the first antenna based on the indication comprises determining, via the processing circuitry, a plurality of first scores for a subset of the plurality of antennas based on the plurality of MTPL values, the plurality of RSSI values, and a plurality of efficiency values, wherein the subset of the plurality of antennas excludes at least one antenna of the plurality of antennas, and selecting, via the processing circuitry, the first antenna from the plurality of antennas based on a highest score of the plurality of first scores; and when the indication is indicative of the electronic device being outside the threshold distance of the base station, determining the first antenna based on the indication comprises determining, via the processing circuitry, a plurality of second scores for the plurality of antennas based on the plurality of MTPL values, the plurality of RSSI values, and the plurality of efficiency values, and selecting, via the processing circuitry, the first antenna from the plurality of antennas based on a highest score of the plurality of second scores.

14. The method of claim 12, further comprising:

determining, via the processing circuitry, a second antenna of the plurality of antennas based on the indication; and causing, via the processing circuitry, the second transmitter of the electronic device to transmit a second RF signal to the second antenna.

15. The method of claim 12, further comprising receiving, via the processing circuitry, at least one RSSI value of the plurality of RSSI values from the base station.

16. A non-transitory computer-readable medium comprising instructions that, when executed by processing circuitry of an electronic device, cause the processing circuitry to:

determine a first antenna of a plurality of antennas of the electronic device for a first transmitter of the electronic device and a second antenna of the plurality of antennas for a second transmitter of the electronic device based on a lowest maximum transmitted power limit (MTPL) value from a first MTPL value of a plurality of MTPL values associated with the first respective antenna and the first transmitter and a second MTPL value of the plurality of MTPL values associated with another antenna of the plurality of antennas and the second transmitter; and cause the first transmitter to transmit a first radio frequency (RF) signal to the first antenna and the second transmitter to transmit a second RF signal to the second antenna.

17. The non-transitory computer-readable medium of claim 16, wherein the instructions, when executed, cause the processing circuitry to:

receive, from a base station, an indication of whether the electronic device is within a threshold distance of the base station; and determine, via the processing circuitry, the first antenna and the second antenna based on the indication.

18. The non-transitory computer-readable medium of claim 17, wherein the instructions, when executed, cause the processing circuitry to determine the first antenna, when the indication is indicative of the electronic device being within the threshold distance of the base station, by:

determining a plurality of first scores for a subset of the plurality of antennas based on the lowest MTPL value from the first MTPL value of the plurality of MTPL values, a plurality of signal characteristic values, and a plurality of efficiency values, wherein the subset of the plurality of antennas excludes at least one antenna of the plurality of antennas; and selecting, via the processing circuitry, the first antenna from the plurality of antennas based on a highest score of the plurality of first scores.

19. The non-transitory computer-readable medium of claim 17, wherein the instructions, when executed, cause the processing circuitry to determine the first antenna, when the indication is indicative of the electronic device being outside the threshold distance of the base station, by:

determining, via the processing circuitry, a plurality of second scores for the plurality of antennas based on the plurality of MTPL values, a plurality of signal characteristic values, and a plurality of efficiency values; and selecting, via the processing circuitry, the first antenna from the plurality of antennas based on a highest score of the plurality of second scores.

20. The non-transitory computer-readable medium of claim 16, wherein the non-transitory computer-readable medium comprises the plurality of MTPL values and a plurality of efficiency values.

* * * * *